(12) United States Patent
Choi (10) Patent No.: US 7,093,057 B2
(45) Date of Patent: Aug. 15, 2006

(54) DISPLAY APPARATUS AND METHOD (75) Inventor: Young-hun Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 135 days.

(21) Appl. No.: 10/621,355

(22) Filed: Jul. 18, 2003

(65) Prior Publication Data
US 2005/0102462 A1 May 12, 2005

(30) Foreign Application Priority Data
Jul. 18, 2002 (KR) ............................... 2002-41991

(51) Int. Cl.
*G06F 13/20* (2006.01)
(52) U.S. Cl. .................... 710/313; 710/316; 710/72
(58) Field of Classification Search .............. 710/8–10, 710/15, 17, 19, 31, 62–64, 100, 300, 305, 710/306, 310–311, 313–314, 316; 345/156
See application file for complete search history.

(56) References Cited

U.S. PATENT DOCUMENTS

| | | | |
|---|---|---|---|
| 6,557,170 B1 * | 4/2003 | Wilder et al. ................. | 710/72 |
| 6,804,727 B1 * | 10/2004 | Rademacher ................. | 710/9 |
| 6,901,455 B1 * | 5/2005 | Gough .......................... | 710/8 |
| 6,934,792 B1 * | 8/2005 | Nakazawa ................... | 710/316 |
| 2003/0079055 A1 * | 4/2003 | Chen ............................. | 710/1 |
| 2003/0093599 A1 * | 5/2003 | Lou et al. ..................... | 710/72 |
| 2004/0075638 A1 * | 4/2004 | Han ............................ | 345/156 |
| 2004/0153597 A1 * | 8/2004 | Kanai et al. ................ | 710/305 |

FOREIGN PATENT DOCUMENTS

| | | |
|---|---|---|
| JP | 2000-214836 | 8/2000 |
| JP | 2001-43178 | 2/2001 |

\* cited by examiner

*Primary Examiner*—Khanh Dang
(74) *Attorney, Agent, or Firm*—Staas & Halsey LLP (57) ABSTRACT

A display method, in which in a plurality of universal serial bus (USB) systems shares one display device, and USB devices connected to the display device and USB devices connected to the plurality of USB systems are shared,. The method includes, while output of a first predetermined USB system, among the plurality of USB systems, is transmitted to the display device, providing a predetermined menu to select a USB device to be shared and selecting a second predetermined USB system to connect to the selected USB device; if a menu item is selected, disabling a driver, which corresponds to the shared USB device in the first USB system; buffering information transmitted from the shared USB device in the display device; and transmitting the information, which is buffered in the display device, to the driver, which corresponds to the shared USB device, in the second USB system.

32 Claims, 5 Drawing Sheets

DISPLAY APPARATUS AND METHOD

CROSS-REFERENCE TO RELATED APPLICATIONS

This application claims the priority of Korean Patent Application No. 2002-41991, filed on Jul. 18, 2002, in the Korean Intellectual Property Office, the disclosure of which is incorporated herein in its entirety by reference.

BACKGROUND OF THE INVENTION

1. Field of the Invention

The present invention relates to a display apparatus and method, and more particularly, to a display apparatus and method, by which screen switching and switching of an input device thereof are automatically performed, and a universal serial bus (USB) device connected to a monitor hub and a USB device connected to a PC are shared between several PCs when several PCs are connected to one monitor.

2. Description of the Related Art

Figure 1A:
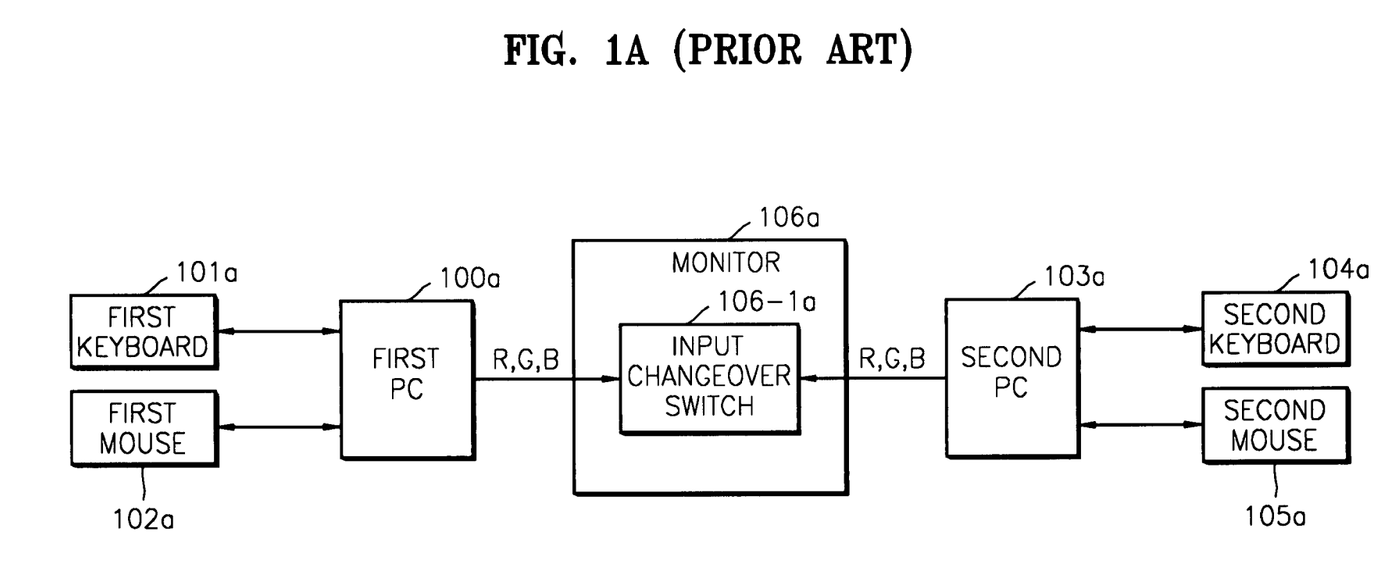
FIGS. 1A and 1B are block diagrams illustrating the structure of a conventional display apparatus.
Figure 1B:
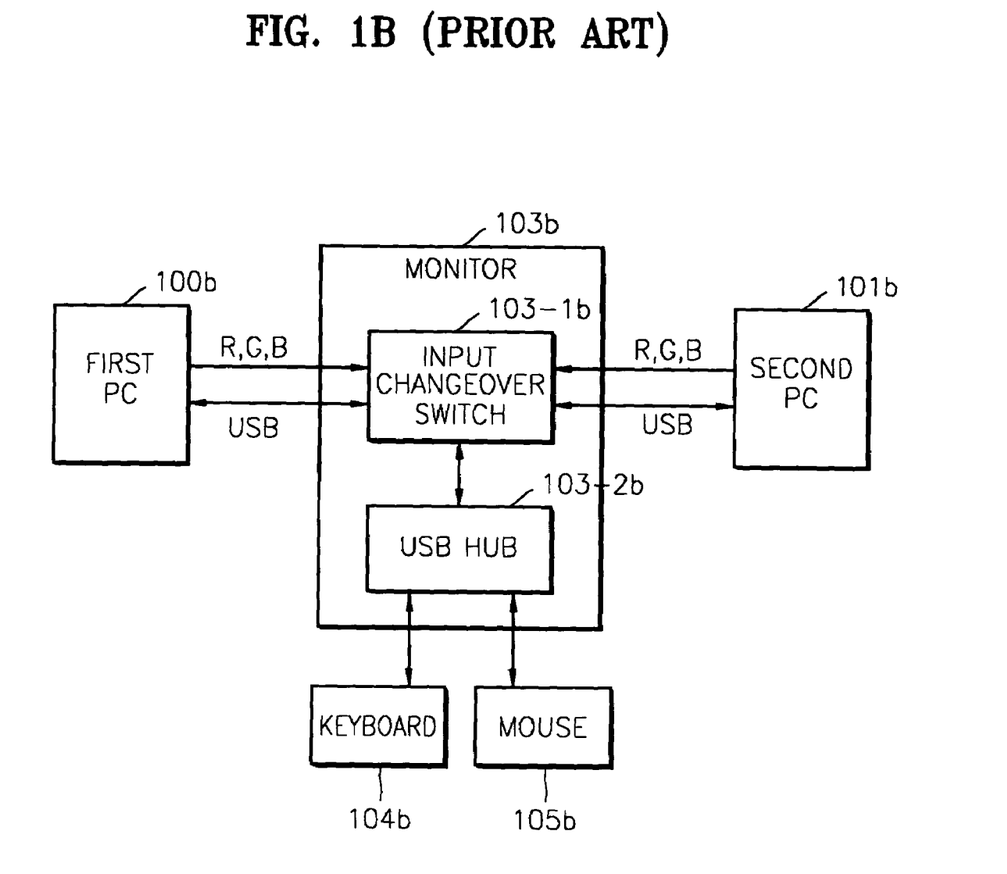

FIGS. 1A and 1B are block diagrams illustrating the structure of a conventional display apparatus. Hereinafter, a PC mainframe is referred to as a PC. FIG. 1A illustrates the conventional setup of a monitor shared between two PCs. A user selects a corresponding PC (first PC 100a or second PC 103a) input from an input changeover switch 106-1a. A MICOM (not shown) of the monitor 106a senses the PC input and outputs a control signal which enables an RGB signal to be output from the corresponding PC (first PC 100a or second PC 103a) and to be input to the monitor 106a. The following operation is similar to the normal operation of a monitor. If the user switches the input changeover switch 106a-1a to the first PC 100a, the monitor 106a receives and displays the RGB signal output from the first PC 100a. A first keyboard 101a or first mouse 102a is used as an input device to the first PC 100a. If the user switches the input changeover switch 106-1a to a second PC 103a, the monitor 106 receives and displays the RGB signal output from the second PC 103a. A second keyboard 104a or second mouse 105a is used as an input device to the second PC 103a.

As many input devices as PCs are required in the structure of the conventional display apparatus shown in FIG. 1A. This requirement demands a large space to accommodate the two or more input devices. In addition, the user can be easily confused when trying to select the input device that corresponds to the output screen.

In FIG. 1B, a USB hub 103-2b is included in the display apparatus. If the user selects a PC (first PC 100b or second PC 101b) using an input changeover switch 103-1b, a RGB signal is input to a monitor 103b from the selected PC and displayed on the screen. Simultaneously, an upstream port of the USB hub 103-2b is physically connected to the selected PC, providing support to input devices (keyboard 104b and mouse 105b).

In FIG. 1B, unlike in FIG. 1A, since input devices (keyboard 104b and mouse 105b) are connected to a USB port of the monitor 103b, as many input devices as PCs are not required. However, the user must directly select the desired PC using the input changeover switch 103-1b. In this case, the upstream port of the USB hub 103-2b is physically disconnected from or connected to the corresponding PC. However, it is difficult to connect other peripheral devices, other than the keyboard 104b or mouse 105b, to the corresponding PC.

SUMMARY OF THE INVENTION

The present invention provides a display apparatus and method, by which screen switching and switching of an input device thereof are automatically performed, and a universal serial bus (USB) device connected to a monitor hub and a USB device connected to a PC are shared between several PCs when several PCs are connected to one monitor.

According to an aspect of the present invention, there is included a display method, in which a plurality of universal serial bus (USB) systems to share one display device are included, and USB devices connected to the display device and USB devices connected to the plurality of USB systems are shared, the method comprising, while output of a first predetermined USB system, among the plurality of USB systems, is transmitted to the display device, providing a predetermined menu to select a USB device to be shared and selecting a second predetermined USB system to connect to the selected USB device; if a menu item is selected, disabling a driver, which corresponds to the shared USB device in the first USB system; buffering information transmitted from the shared USB device in the display device; and transmitting the information, which is buffered in the display device, to the driver, which corresponds to the shared USB device, in the second USB system.

If the shared USB device is a keyboard or mouse, an input signal of the display device is switched so that output of the second USB system is transmitted to the display device.

The method further comprises releasing the shared USB device from the second USB system.

The releasing operation comprises, while output of the second USB system are transmitted to the display device, providing a predetermined menu to select a USB device to be released; if a menu item is selected, enabling a driver, which corresponds to the shared USB device, in the first USB system; and transmitting information, which is transmitted from the USB device, to a driver, which corresponds to the USB device, in the first USB system through the display device.

If the released USB device is a keyboard or mouse, an input signal of the display device is switched so that output of the first USB system are transmitted to the display device.

According to another aspect of the present invention, there is included a display apparatus, in which in a plurality of universal serial bus (USB) systems sharing one display device are included, and USB devices connected to the display device and USB devices connected to the plurality of USB systems are shared, wherein the apparatus includes a relay unit included in the display device, while output of a first predetermined USB system, among the plurality of USB systems is transmitted to the display device, the relay unit selects to share the USB device being used in the USB system with a second predetermined USB system, and if a driver, which corresponds to the shared USB device, in the first USB system is disabled, the relay unit buffers information transmitted from the shared USB device in the display device and transmits the information buffered in the display device to a driver corresponding to the shared USB device of the second USB system.

If the shared USB device is a keyboard or mouse, an input signal of the display device is switched so that output of the second USB system is transmitted to the display device.

If the USB device is released from the second USB system and if a driver, which corresponds to the shared USB device, in the first USB system is enabled, the relay unit transmits the information transmitted from the USB device to the driver, which corresponds to the USB device, in the first USB system.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
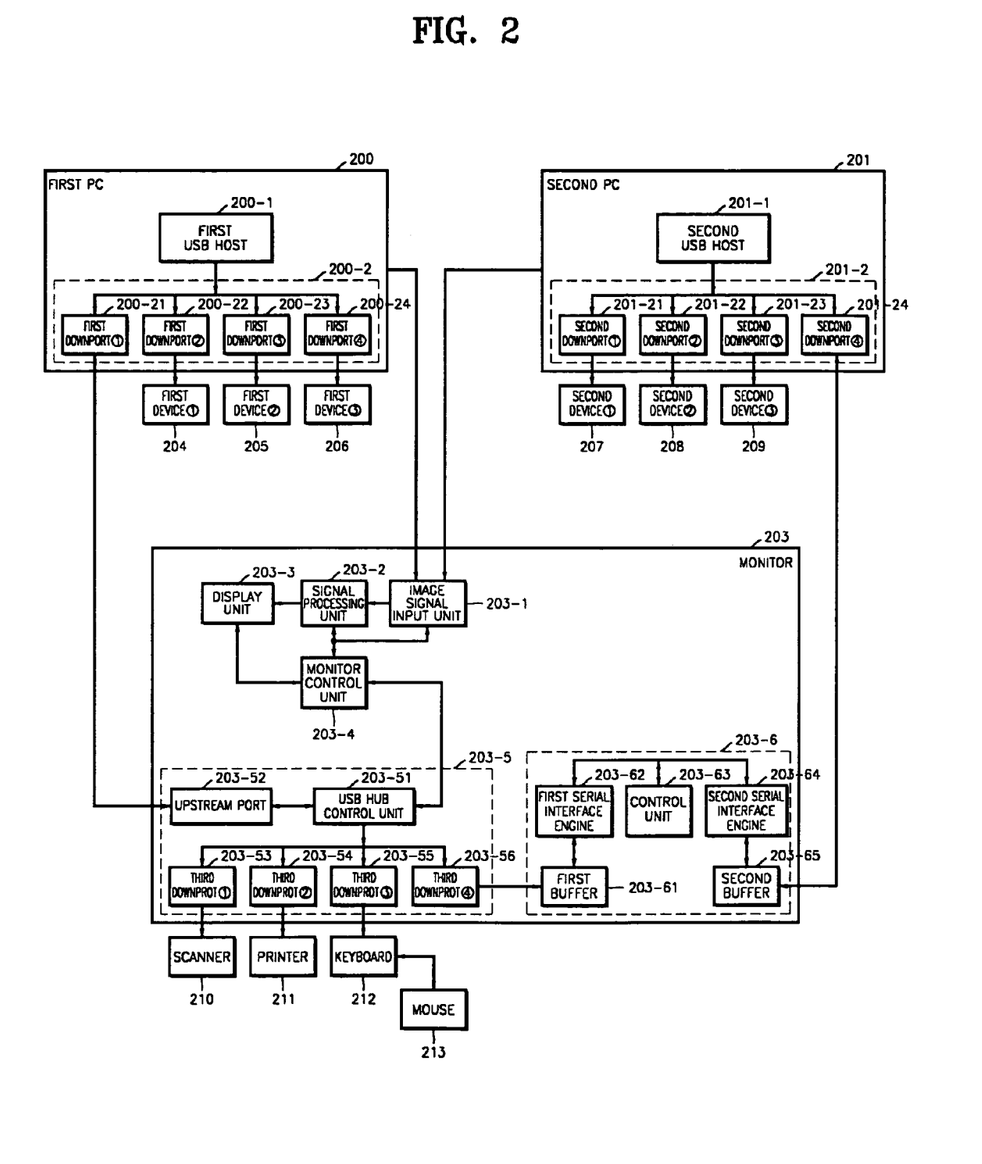
FIG. 2 is a block diagram illustrating the structure of a display apparatus according to an embodiment of the present invention.

FIG. 2 is a block diagram illustrating the structure of a display apparatus according to the present invention. The display apparatus includes a first PC 200; first devices ①, ②, and ③ 204, 205, and 206 connected to the first PC 200; a second PC 201; second devices ①, ②, and ③ 207, 208, and 209 connected to the second PC 201; a monitor 203; a scanner 210 connected to the monitor 203; a printer 211 connected to the monitor 203; a keyboard 212 connected to the monitor 203; and a mouse 213 connected to the monitor 203. The first PC 200 includes a first universal serial bus (USB) host 200-1 and a port 200-2 including first down ports ①, ②, ③, and ④ 200-21, 200-22, 200-23, and 200-24. The second PC 201 includes a second USB host 201-1 and a port 201-2 including second down ports ①, ②, ③, and ④ 201-21, 201-22, 201-23, and 201-24. The monitor 203 includes an image signal input unit 203-1, a signal processing unit 203-2, a display unit 203-3, a monitor control unit 203-4, a monitor USB hub 203-5, and a relay unit 203-6. The monitor USB hub 203-5 includes a USB hub control unit 203-51, an upstream port 203-52, and third down ports ①, ②, ③, and ④ 203-53, 203-54, 203-55, and 203-56. The relay unit 203-6 includes a first buffer 203-61, a first serial interface engine 203-62, a control unit 203-63, a second serial interface engine 203-64, and a second buffer 203-65.

Figure 3A:
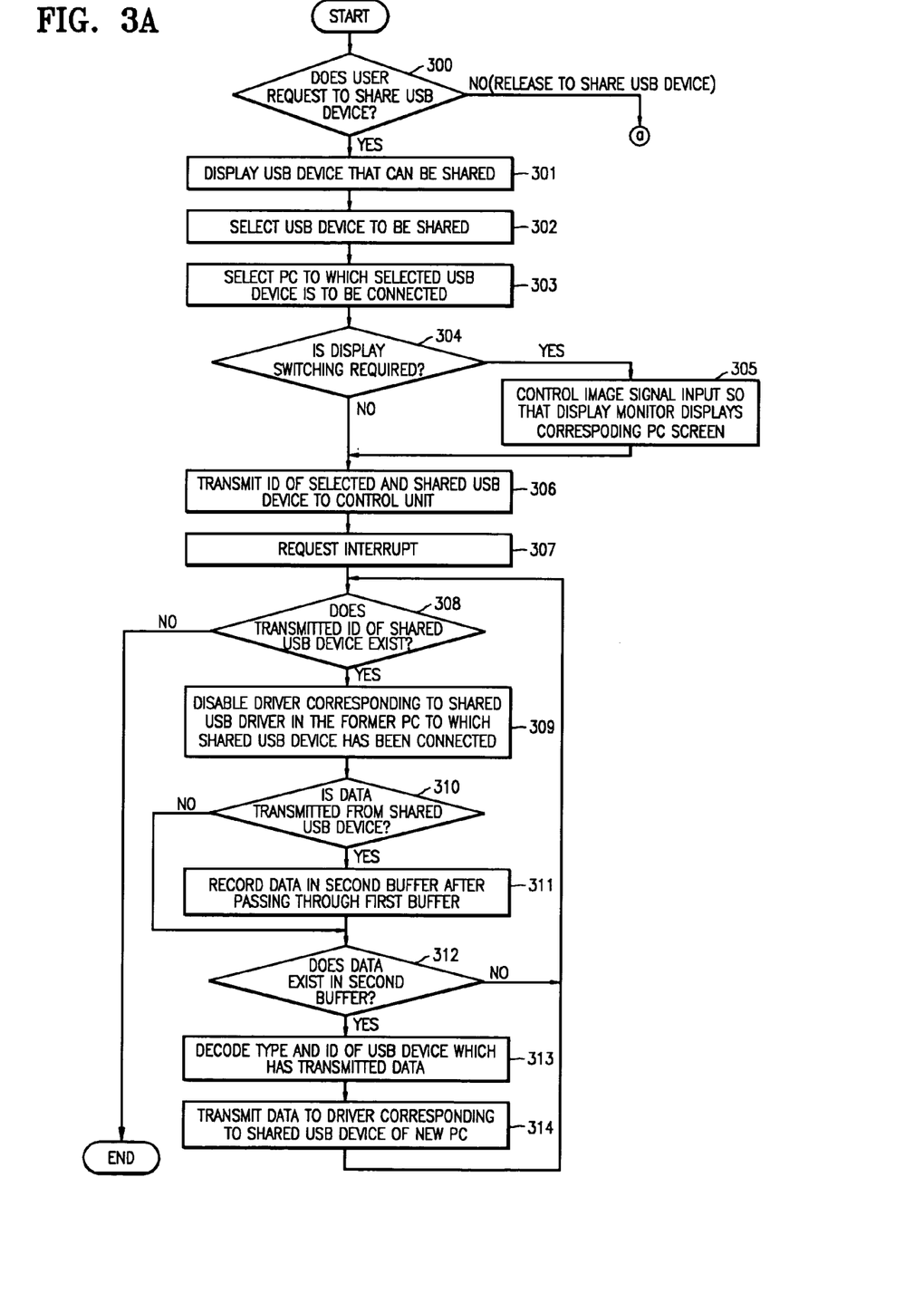
FIGS. 3A and 3B are flowcharts illustrating a display method according to an embodiment of the present invention.
Figure 3B:
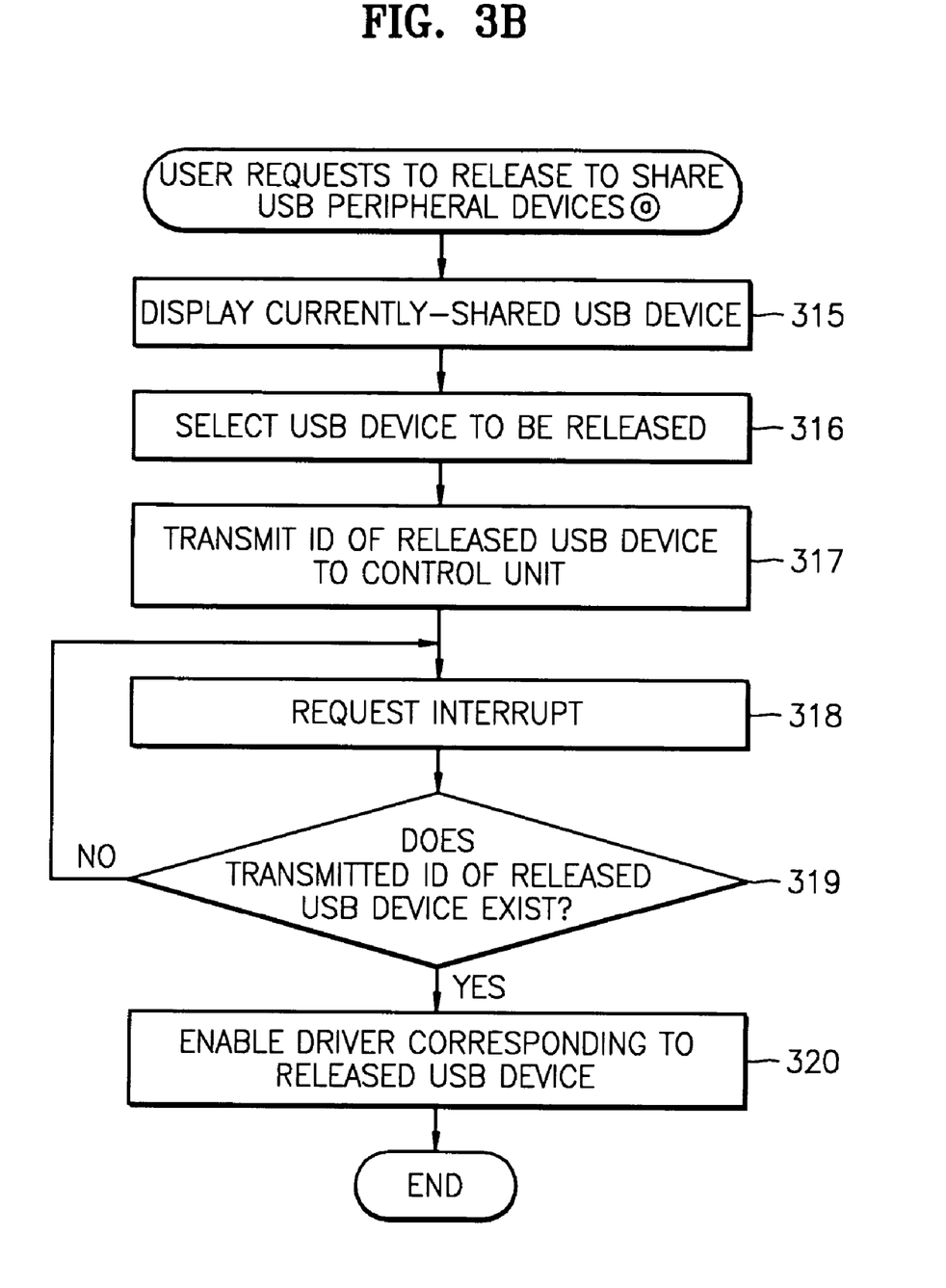

FIGS. 3A and 3B are flowcharts illustrating a display method according to the present invention. The display method according to the present invention comprises operations of determining whether a user requests to share a USB device with the second PC 201 (300), displaying a USB device that can be shared with the second PC 201 (301), selecting a USB device to be shared with the second PC 201 (302), selecting a PC to which the selected and shared USB device is to be connected (303), determining whether display switching is required (304), controlling an image signal input so that a monitor displays the corresponding PC screen (305), transmitting an ID of the selected and shared USB device to a control unit (306), requesting interrupt (307), determining whether the transmitted ID of the shared USB device exists (308), disabling a driver corresponding to the shared USB device in the former PC to which the shared USB device has been connected (309), determining whether data is transmitted from the shared USB device (310), recording the data in a second buffer after passing through a first buffer (311), determining whether data exists in the second buffer (312), decoding the type and ID of the USB device which has transmitted the data (313), transmitting data to a driver corresponding to the shared USB device of a new PC (314), displaying the currently shared USB device (315), selecting a USB device to be released (316), transmitting an ID of the released USB device to the control unit (317), requesting an interrupt (318), determining whether the transmitted ID of the released USB device exists (319), enabling a driver corresponding to the released USB device (320), and determining whether a shared USB device exists (not shown).

Hereinafter, the present invention will be described in detail with reference to FIGS. 2, 3A, and 3B.

The first PC 200 and the second PC 201 described above are referred to as first and second USB systems in the following claims, and the monitor 203 described above is referred to as a display device.

The first and second PCs 200 and 201 share the monitor 203. That is, when the user uses the first PC 200, output of the first PC 200 is displayed on the monitor 203, and when the user uses the second PC 201, output of the second PC 201 is displayed on the monitor 203. In the present invention, although the system sharing the monitor 203 discussed in relation to two PCs, such as the first and second PCs 200 and 201, two or more PCs may be used.

The first USB host 200-1 of the first PC 200 controls USB communication between the first PC 200 and one of the first devices ①, ②, and ③, 204, 205, and 206 connected to the first PC 200. Here, the first devices ①, ②, and ③ 204, 205, and 206 may each be a scanner, printer, keyboard, or mouse, and is not limited to the above example. The first USB host 200-1 includes a hub (not shown). The hub relays input/output data of the first devices ①, ②, and ③, 204, 205, and 206 connected to the first PC 200 through the first down ports ①, ②, ③, and ④ 200-21, 200-22, 200-23, and 200-24.

The second USB host 201-1 of the second PC 201 controls USB communication between the second PC 201 and one of the second devices ①, ②, and ③ 207, 208, and 209 connected to the second PC 201. Here, the second devices ①, ②, and ③ 207, 208, and 209 may each be a scanner, printer, keyboard, or mouse, and is not limited to the above example. The second USB host 201-1 includes a hub (not shown). The hub relays input/output data of the second devices ①, ②, and ③ 207, 208, and 209 connected to the second PC 201 through the second down ports ①, ②, ③, and ④ 201-21, 201-22, 201-23, and 201-24.

The monitor 203 displays output from the first PC 200 or second PC 201. The image signal input unit 203-1 receives an image signal transmitted from the first PC 200 or the second PC 201. The signal processing unit 203-2 performs signal processing to display the transmitted image signal. The display unit 203-3 displays the signal-processed image signal. The monitor control unit 203-4 controls all operations performed so that received image signals are displayed, and controls each block of the monitor 203.

The scanner 210, the printer 211 and the keyboard 212 which are USB devices, are connected to the monitor 203 through the monitor USB hub 203-5. The USB hub control unit 203-51 controls the third down ports ①, ②, ③, and ④ 203-53, 203-54, 203-55, and 203-56, which enables connection of a USB device to each of the third down ports ①, ②, ③, and ④ 203-53, 203-54, 203-55, and 203-56 and enables transmission of a signal from a USB device to the upstream port 203-52. The upstream port 203-52 is connected to the first down port ① 200-21 of the first PC 200, establishing USB communication between the first USB host 200-1 and the monitor 203.

The relay unit 203-6 relays data transmission when the first PC 200 and the second PC 201 share a USB device. The first buffer 203-61 buffers the signal transmitted from the selected and shared USB device. The buffered signal is transmitted to the control unit 203-63 through the first serial interface engine 203-62. The control unit 203-63 checks the ID of the shared USB device and transmits the buffered signal to the second buffer 203-65 through the second serial interface engine 203-64. The second PC 201 accesses the second buffer 203-65, receives data stored in the second buffer 203-65 transmitted through the second down port ④ 201-24 to the second USB host 201-1, and drives a driver corresponding to the USB device.

The display method by which the first and second PCs 200 and 201 share different USB devices through the relay unit 203-6 of the monitor 203, will be described with reference to FIGS. 3A and 3B.

When the user uses the first PC 200, output of the first PC 200 is transmitted to the monitor 203. In this case, if it is assumed that the input device is the keyboard 212 and the mouse 213, which are connected to the monitor 203, then data input from the keyboard 212 and the mouse 213 is transmitted to the USB hub control unit 203-51 through the third down port ③ 203-55. The USB hub control unit 203-51 outputs the data to the upstream port 203-52, and the data is then transmitted to the first USB host 200-1 through the first down port ① 200-21 of the first PC 200. The first USB host 200-1 transmits the data to the drivers corresponding to the keyboard 212 and the mouse 213 and transmits the results of data processing to the image signal input unit 203-1 from the drivers corresponding to the keyboard 212 and the mouse 213. The signal processing unit 203-2 performs signal processing on the data, which is output to the display unit 203-3.

In operation 300, it is determined whether the user requests to share a USB device with the second PC 201. When the user uses the keyboard 212 and the mouse 213 as input devices to the first PC 200 and wishes to share the keyboard 212 and the mouse 213 with the second PC 201, the user opens a share program stored in the first PC 200. For example, the user might desire to share the keyboard 212 and the mouse 213 so as to perform CAD work in the second PC 201 while performing word processing in the first PC 200. In this case, the first PC 200 can open the share program by clicking the right button on the mouse 213. The share program is applied to both the first and second PCs 200 and 201.

If the user using the first PC 200 selects the share program to share a USB device with the second PC 201, then in operation 301, the USB devices that can be shared with the second PC 201 are displayed on the monitor 203. In the case of the first PC 200, the first devices ①, ②, and ③ 204, 205, and 206; the scanner 210; the printer 211; the keyboard 212; and the mouse 213 are displayed on the monitor 203, and in the case of the second PC 201, the second devices ①, ②, and ③ 207, 208, and 209 are displayed on the monitor 203.

In operation 302, the displayed USB devices that can be shared with the second PC 201 are seen, and a USB device to be shared with the second PC 201 is selected. For example, if the user wants to share the keyboard 212 and the mouse 213 with the second PC 201 while using the first PC 200, the USB devices selected are the keyboard 212 and the mouse 213.

If a shared USB device is selected, then in operation 303, a PC is selected to connect to the selected and shared USB device. If the keyboard 212 and the mouse 213 are the selected USB devices to be shared with the second PC 201, the PC selected is the second PC 201.

In operation 304, it is determined whether display switching is required. It is determined whether the monitor 203 displaying the output of the first PC 200, must display the output of the second PC 201.

If display switching is required, in operation 305, the image signal input is controlled so that the monitor 203 displays the corresponding USB host screen. When the shared USB device is the scanner 210 or printer 211, display switching is not required. However, when the shared USB device is the keyboard 212 or the mouse 213, the image signal input is controlled so that the output of the second PC 201 is transmitted to the monitor 203.

After the PC is selected and display switching is performed, then in operations 306 and 307, an ID of the selected and shared USB device is transmitted to the control unit 203-63 of the relay unit 203-6, and an interrupt is requested.

In operations 308 and 309, the control unit 203-63 of the relay unit 203-6 determines whether the transmitted ID of the shared USB device exists and, if the transmitted ID of the shared USB device exists, the driver corresponding to the shared USB device is disabled in the PC to which the shared USB device was initially connected. For example, the keyboard 212 and the mouse 213 are connected to the second PC 201 only after the first PC 200 disables drivers corresponding to the keyboard 212 and the mouse 213.

In operations 310 and 311, it is determined whether data is transmitted from the shared USB device. If data is transmitted, then the data is recorded in the second buffer 203-65 after passing through the first buffer 203-61. The data input from the keyboard 212 and the mouse 213 is transmitted to the first USB host 200-1 through the third down port ③ 203-55, the upstream port 203-52, and the first down port ① 200-21. However, since the drivers corresponding to the keyboard 212 and the mouse 213 are disabled, data processing is not performed, and the data is recorded in the first buffer 203-61 of the relay unit 203-6 through the first down port ① 200-21, the upstream port 203-52, and the third down port ④ 203-56. Data of the keyboard 212 and the mouse 213 recorded in the first buffer 203-61 is serial data, and the serial data is converted into parallel data by the first serial interface engine 203-62 and transmitted to the control unit 203-63. The control unit 203-63 checks the ID of the keyboard 212 and the mouse 213, and the parallel data is then converted into serial data by the second serial interface engine 203-64 and buffered by the second buffer 203-65.

In operation 312, the second PC 201 frequently checks the second buffer 203-65 and determines whether any data exists in the second buffer 203-65.

If data exists in the second buffer 203-65, then in operation 313, the type and ID of the USB device, which has transmitted the data, are decoded.

In operation 314, the data is transmitted to the driver in the second PC 201, corresponding to the shared USB device. Data from the keyboard 212 and the mouse 213 stored in the second buffer 203-65 is transmitted to the second USB host 201-1 through the second down port ④ 201-24. The second USB host 201-1 operates the drivers corresponding to the keyboard 212 and the mouse 213 using the transmitted data.

When the user wants to release the shared USB device, the user opens the share program stored in the first PC 200 or second PC 201. The first PC 200 can open a share release program by clicking the right button on the mouse 213. The share program is applied to both the first PC 200 and the second PC 201.

When the user of the first PC 200 selects the share program to release the USB device from the second PC 201, then in operation 315, the USB device currently shared is displayed on the monitor 203. In the case of the first PC 200; the first devices①, ②, and ③ 204, 205, and 206; the scanner 210; the printer 211; the keyboard 212; and the mouse 213 are displayed on the monitor 203, and in the case of the second PC 201, the second devices ①, ②, and ③ 207, 208, and 209 are displayed on the monitor 203.

In operation 316, a USB device is selected to be released from the second PC 201. For example, if the user shares the keyboard 212 and the mouse 213 with the first and second PCs 200 and 201 and wishes to release the second PC 201 from the keyboard 212 and the mouse 213, the USB devices selected are the keyboard 212 and the mouse 213.

If a USB device is selected to be released, in operations 317 and 318, it is determined whether display switching is required. If display switching is required, display switching is performed, and then an ID of the released USB device is transmitted to the control unit 203-63, and an interrupt is requested.

In operations 319 and 320, the control unit 203-63 of the relay unit 203-6 determines whether the transmitted ID of the released USB device exists. If the transmitted ID of the released USB device exists, a driver corresponding to the released USB device is enabled in the PC to which the released USB device is still connected. For example, the keyboard 212 and the mouse 213 are released from the second PC 201, and thus, the first PC 200 enables drivers corresponding to the keyboard 212 and the mouse 213. After that, the data input from the keyboard 212 and the mouse 213 is transmitted to the first USB host 200-1 through the third down port ③ 203-55, the upstream port 203-52, and the first down port ① 200-21.

As described above, the display apparatus and method, according to the present invention automatically perform screen switching and switching of an input device thereof and share between several PCs a universal serial bus (USB) device connected to a monitor hub and a USB device connected to a PC body, when several PCs are connected to one monitor.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display method, in a system including a plurality of universal serial bus (USB) systems sharing one display device, a first group of USB devices connected to the display device and sharable by the USB systems, and a second group of sharable USB devices directly connected to one of the plurality of USB systems, the method comprising:

while output of a first one of the plurality of USB systems is transmitted to the display device, providing a predetermined sharing menu, with sharing menu items, to select to share one of the USB devices of the second group being used with the first USB system and selecting a second one of the USB systems to connect to the selected USB device of the second group to be shared;

when one of the sharing menu items is selected, sharing the selected USB device of the second group to be shared by disabling a first driver, which corresponds to the shared USB device in the first USB system;

buffering information transmitted from the shared USB device in the display device; and transmitting the information, which is buffered in the display device, to a second driver, which corresponds to the shared USB device, in the second USB system.

2. The method of claim 1, wherein, if the shared USB device is a keyboard or mouse, an input signal of the display device is switched so that output of the second USB system is transmitted to the display device.

3. The method of claim 1, further comprising releasing the shared USB device from the second USB system.

4. The method of claim 3, wherein the releasing comprises:

while output of the second USB system are transmitted to the display device, providing a predetermined releasing menu, with releasing menu items, to select a shared USB device to be released;

if one of the releasing menu items is selected, enabling the first driver, which corresponds to the shared USB device, in the first USB system; and transmitting information, which is transmitted from the shared USB device, to the first driver, which corresponds to the shared USB device, in the first USB system through the display device.

5. The method of claim 4, wherein, if the released USB device is a keyboard or mouse, an input signal of the display device is switched so that output of the first USB system are transmitted to the display device.

6. A display apparatus, usable in a system including a plurality of universal serial bus (USB) systems sharing one display device, a first group of USB devices connected to the display device and sharable by the USB systems, and a second group of sharable USB devices directly connected to one of the plurality of USB systems, the display apparatus comprising:

a relay unit in the display device, wherein, while output of a first one of the USB systems is transmitted to the display device, the relay unit selects to share with a second one of the USB systems one of the USB devices of the second group being used with the first USB system, and if a first driver, which corresponds to the shared USB device, in the first USB system is disabled, the relay unit buffers information transmitted from the shared USB device in the display device and transmits the information buffered in the display device to a second driver, which corresponds to the shared USB device in the second USB system.

7. The apparatus of claim 6, wherein, if the shared USB device is a keyboard or mouse, an input signal of the display device is switched so that output of the second USB system are transmitted to the display device.

8. The apparatus of claim 6, wherein, if the shared USB device is released from the second USB system and if the first driver, which corresponds to the shared USB device, in the first USB system, is enabled, the relay unit transmits the information transmitted from the USB device to the first driver, which corresponds to the USB device, in the first USB system.

9. A display method, comprising:
opening a sharing program stored in a first Universal Serial Bus (USB) host;
selecting a USB device, connected to the first USB host, to share the selected USB device with a second USB host;
determining whether an ID of the selected USB device exists, and if the ID exists, disabling drivers in the first USB host corresponding to the selected USB device;
transmitting data from the selected USB device to the second USB host; and
operating drivers, associated with the second USB host, corresponding to the selected USB device according to the transmitted data.

10. The display method according to claim 9, wherein the selecting comprises clicking on a mouse button.

11. The display method according to claim 9, wherein the selecting comprises:
displaying USB devices that can be shared;
selecting the USB device; and
selecting the second USB host.

12. The display method according to claim 9, further comprising display switching from an output of the first USB host to an output of the second USB host.

13. The display method according to claim 9, wherein the determining comprises:
transmitting an ID of the selected USB device to a control unit of a relay unit; and
determining that the ID exists.

14. The display method according to claim 9, wherein the transmitting comprises:
recording the transmitted data in a buffer;
decoding the recorded data; and
transmitting the decoded data to the drivers, associated with the second USB host, corresponding to the selected USB device.

15. The display method according to claim 9, further comprising releasing the selected USB device from the second USB host.

16. The display method according to claim 15, wherein the releasing comprises display switching from an output of the second USB host to an output of the first USB host.

17. The display method according to claim 15, wherein the releasing comprises:
determining whether the ID of the released USB device exists;
enabling a driver, associated with the first USB host, corresponding to the released USB device.

18. A display apparatus, comprising:
a first Universal Serial Bus (USB) system having a first down port;
a USB bus system having a second down port; and
a shared USB device displaying output from the first and second USB systems, having a USB hub, including an upstream port, and a relay unit relaying data transmission when the USB device is shared, including a second buffer, wherein the upstream port is connected to the first down port, and the second buffer is connected to the second down port.

19. The display apparatus according to claim 18, wherein the first USB system is a first personal computer.

20. The display apparatus according to claim 19, wherein when the first personal computer is used, the shared USB device displays an output of the personal computer.

21. The display apparatus according to claim 19, wherein the first USB system includes a first USB host.

22. The display apparatus according to claim 21, wherein the first USB host controls USB communication between the first personal computer and first devices connected to the first personal computer.

23. The display apparatus according to claim 22, wherein the first USB host includes a hub relaying data of the first devices through the first down port.

24. The display apparatus according to claim 19, wherein the second USB system is a second personal computer.

25. The display apparatus according to claim 24, wherein when the personal computer is used, the USB device displays an output of the second personal computer.

26. The display apparatus according to claim 24, wherein the second USB system includes a second USB host.

27. The display apparatus according to claim 26, wherein the second USB host controls USB communication between the second personal computer and second devices connected to the second personal computer.

28. The display apparatus according to claim 27, wherein the second USB host includes a hub relaying data of the second devices through the second down port.

29. The display apparatus according to claim 18, wherein the shared USB device is a monitor.

30. The display apparatus according to claim 29, wherein the monitor comprises:
an image signal input unit to receive an image signal;
a signal processing unit to perform signal processing of the image signal;
a display unit to display the image signal; and
a monitor control unit to control the image signal input unit, the signal processing unit, and the display unit.

31. The display apparatus according to claim 18, wherein the USB hub comprises:
a control unit; and
third down ports, wherein the control unit controls third down ports enabling transmission of a signal from a third device to the upstream port.

32. The display apparatus according to claim 18, wherein the relay unit comprises:
a first buffer to buffer the signal transmitted from the USB device; and
a control unit, wherein the control unit checks the identification of the USB device and transmits the buffered signal to the second buffer.

* * * * *

UNITED STATES PATENT AND TRADEMARK OFFICE
CERTIFICATE OF CORRECTION

| | | |
|---|---|---|
| PATENT NO. | : 7,093,057 B2 | Page 1 of 1 |
| APPLICATION NO. | : 10/621355 | |
| DATED | : August 15, 2006 | |
| INVENTOR(S) | : Young-hun Choi | |

It is certified that error appears in the above-identified patent and that said Letters Patent is hereby corrected as shown below:

Title Page Column 2 (Abstract), Line 4, change "shared,." to --shared.--.

Signed and Sealed this

Sixteenth Day of January, 2007

JON W. DUDAS
*Director of the United States Patent and Trademark Office*